UNITED STATES PATENT OFFICE.

ROBERT RUDOLPH GRAF, OF BALTIMORE, MARYLAND, ASSIGNOR, BY DIRECT AND MESNE ASSIGNMENTS, TO THE PHOENIX FIRE PROOF PAINT COMPANY, OF NEW YORK, N. Y.

FIREPROOF PAINT.

SPECIFICATION forming part of Letters Patent No. 494,508, dated March 28, 1893.

Application filed December 13, 1892. Serial No. 455,074. ((No specimens.))

*To all whom it may concern:*

Be it known that I, ROBERT RUDOLPH GRAF, a citizen of the United States, and a resident of Baltimore, in the State of Maryland, have invented certain new and useful Improvements in Fireproof Paints; and I do hereby declare that the following is a full, clear, and exact description of the invention, which will enable others skilled in the art to which it appertains to make and use the same.

My invention relates to improvements in fire-proof paints and consists in the novel composition hereinafter fully set forth and claimed.

In preparing my composition, I use the following ingredients: tungstate of ammonia two parts; hyposulphite of ammonia five parts; sulphate of soda ten parts; caustic lime fifteen parts; chalk two parts; alum three parts; and carbonate of soda five parts. These materials or substances are firmly pulverized and are commingled with a sufficient quantity of oil to give the consistency of ordinary paint, any suitable pigment being also added to give the required color.

While my invention is designed primarily as a paint it may also be used for rendering dress goods or other fabrics fire proof. In this case, a sufficient quantity of water is employed in place of the oil, which is dispensed with, to give the proper consistency. The said fabrics are dipped in the solution and thoroughly impregnated or saturated therewith. They are then removed and dried, without wringing, when they are ready for ironing. Fabrics so treated, are rendered almost absolutely fire-proof, as they will not burn under the highest temperature, but simply become charred or carbonized.

Having thus described my invention, what I claim is—

1. A fire-proof paint consisting of tungstate of ammonia, hyposulphite of ammonia, sulphate of soda, caustic lime, chalk, alum, carbonate of soda, and oil in about the proportions herein specified.

2. A fire-proof composition consisting of tungstate of ammonia, hyposulphite of ammonia, sulphate of soda, caustic lime, chalk, alum, carbonate of soda, and a suitable liquid in about the proportions specified.

In testimony that I claim the foregoing as my own I have hereunto affixed my signature in presence of two witnesses.

ROBERT RUDOLPH GRAF.

Witnesses:
JNO. T. MADDOX,
THOS. W. MORSE.